US012671716B2

(12) United States Patent
Ma et al.

(10) Patent No.:  US 12,671,716 B2
(45) Date of Patent:  Jun. 30, 2026

(54) MACHINE LEARNING TO DETERMINE COMMAND AND CONTROL SITES

(71) Applicant: Zscaler, Inc., San Jose, CA (US)

(72) Inventors: Changsha Ma, Palo Alto, CA (US); Loc Bui, San Jose, CA (US); Dianhuan Lin, Sunnyvale, CA (US); Rex Shang, Los Altos, CA (US); Bryan Lee, San Jose, CA (US); Shudong Zhou, Fremont, CA (US); Howie Xu, Palo Alto, CA (US); Naveen Selvan, Mohali (IN); Nirmal Singh, Chandigarh (IN); Deepen Desai, San Ramon, CA (US); Parnit Sainion, Morgan Hill, CA (US); Narinder Paul, Sunnyvale, CA (US)

(73) Assignee: Zscaler, Inc., San Jose, CA (US)

( * ) Notice: Subject to any disclaimer, the term of this patent is extended or adjusted under 35 U.S.C. 154(b) by 1351 days.

(21) Appl. No.: 17/341,535

(22) Filed: Jun. 8, 2021

(65) Prior Publication Data

US 2021/0377304 A1    Dec. 2, 2021

Related U.S. Application Data

(63) Continuation-in-part of application No. 17/075,991, filed on Oct. 21, 2020, and a continuation-in-part of
(Continued)

(30) Foreign Application Priority Data

Apr. 22, 2021    (IN) .............................. 202111018567

(51) Int. Cl.
     *H04L 29/06*        (2006.01)
     *G06N 5/04*         (2023.01)
     (Continued)

(52) U.S. Cl.
     CPC ........... *H04L 63/1483* (2013.01); *G06N 5/04* (2013.01); *G06N 20/20* (2019.01)

(58) Field of Classification Search
     CPC ....... H04L 63/1483; G06N 20/20; G06N 5/04
     (Continued)

(56) References Cited

U.S. PATENT DOCUMENTS

| | | | |
|---|---|---|---|
| 8,959,626 B2 * | 2/2015 | Niemela | ............... H04L 51/212 |
| | | | 713/188 |
| 9,065,850 B1 | 6/2015 | Sobrier | |

(Continued)

FOREIGN PATENT DOCUMENTS

GB        2575052 A        1/2020

OTHER PUBLICATIONS

Zargar, "A Survey of Defense Mechanisms Against Distributed Denial of Service (DDoS) Flooding Attacks", 2013, IEEE, vol. 15, pp. 2046-2065 (Year: 2013).*

(Continued)

*Primary Examiner* — Taghi T Arani
*Assistant Examiner* — Gregory A Lane
(74) *Attorney, Agent, or Firm* — Baratta Law PLLC; Lawrence A. Baratta, Jr.

(57) ABSTRACT

Systems and methods include receiving a domain for a determination of a likelihood the domain is a command and control site; analyzing the domain with an ensemble of a plurality of trained machine learning models including a Uniform Resource Locator (URL) model that analyzes lexical features of a hostname of the domain and an artifact model that analyzes content features of a webpage associated with the domain; and combining results of the ensemble to predict the likelihood the domain is a command and control site.

20 Claims, 8 Drawing Sheets

Related U.S. Application Data application No. 16/889,885, filed on Jun. 2, 2020, now Pat. No. 12,488,058.

(51) Int. Cl.
G06N 20/20 (2019.01)
H04L 9/40 (2022.01)

(58) Field of Classification Search
USPC ........................................................ 726/23
See application file for complete search history.

(56) References Cited

U.S. PATENT DOCUMENTS

| | | | |
|---|---|---|---|
| 9,152,789 | B2 | 10/2015 | Natarajan et al. |
| 9,838,407 | B1* | 12/2017 | Oprea .................. H04L 63/1416 |
| 10,142,362 | B2 | 11/2018 | Weith et al. |
| 10,419,477 | B2 | 9/2019 | Desai et al. |
| 10,498,605 | B2 | 12/2019 | Weith et al. |
| 2007/0233477 | A1 | 10/2007 | Halowani et al. |
| 2010/0115621 | A1 | 5/2010 | Staniford et al. |
| 2016/0021127 | A1* | 1/2016 | Yan ....................... H04W 12/08 |
| | | | 726/23 |
| 2016/0344770 | A1 | 11/2016 | Verma et al. |
| 2016/0352772 | A1* | 12/2016 | O'Connor ........... H04L 63/1483 |
| 2017/0063886 | A1 | 3/2017 | Muddu et al. |
| 2017/0250968 | A1* | 8/2017 | Licht ...................... H04L 9/3271 |
| 2017/0372071 | A1* | 12/2017 | Saxe ................... H04L 63/1416 |
| 2018/0139235 | A1 | 5/2018 | Desai et al. |
| 2018/0150758 | A1 | 5/2018 | Niininen et al. |
| 2018/0150783 | A1* | 5/2018 | Xu ......................... G06N 3/044 |
| 2018/0293381 | A1 | 10/2018 | Tseng et al. |
| 2019/0281073 | A1 | 9/2019 | Weith et al. |
| 2019/0319972 | A1 | 10/2019 | Desai |
| 2020/0059451 | A1* | 2/2020 | Huang ................... G06N 3/044 |
| 2020/0142810 | A1* | 5/2020 | Zingade .............. G06F 11/3684 |

OTHER PUBLICATIONS

Sadaf, Intrusion Detection Based on Autoencoder and Isolation Forest in Fog Computing, 2020, IEEE, 167059-167067 (Year: 2020).*
Lalouani et al., "Multi-observable reputation scoring system for flagging suspicious user sessions," Computer Networks, vol. 182, Aug. 8, 2022, pp. 1-13.
Jan. 10, 2022, Extended European Search Report issued for European Patent Application No. EP 21 19 1871.
Jordaney, Roberto, et al., "Transcend: Detecting concept drift in malware classification models," 26th {Usenix} Security Symposium ({Usenix} Security 17), 2017.
Kantchelian, Alex, J. D. Tygar, and Anthony Joseph, "Evasion and hardening of tree ensemble classifiers," International Conference on Machine Learning, 2016.
Tolomei, Gabriele, et al., "Interpretable predictions of tree-based ensembles via actionable feature tweaking," Proceedings of the 23rd ACM SIGKDD International Conference on Knowledge Discovery and Data Mining. ACM, 2017.

* cited by examiner

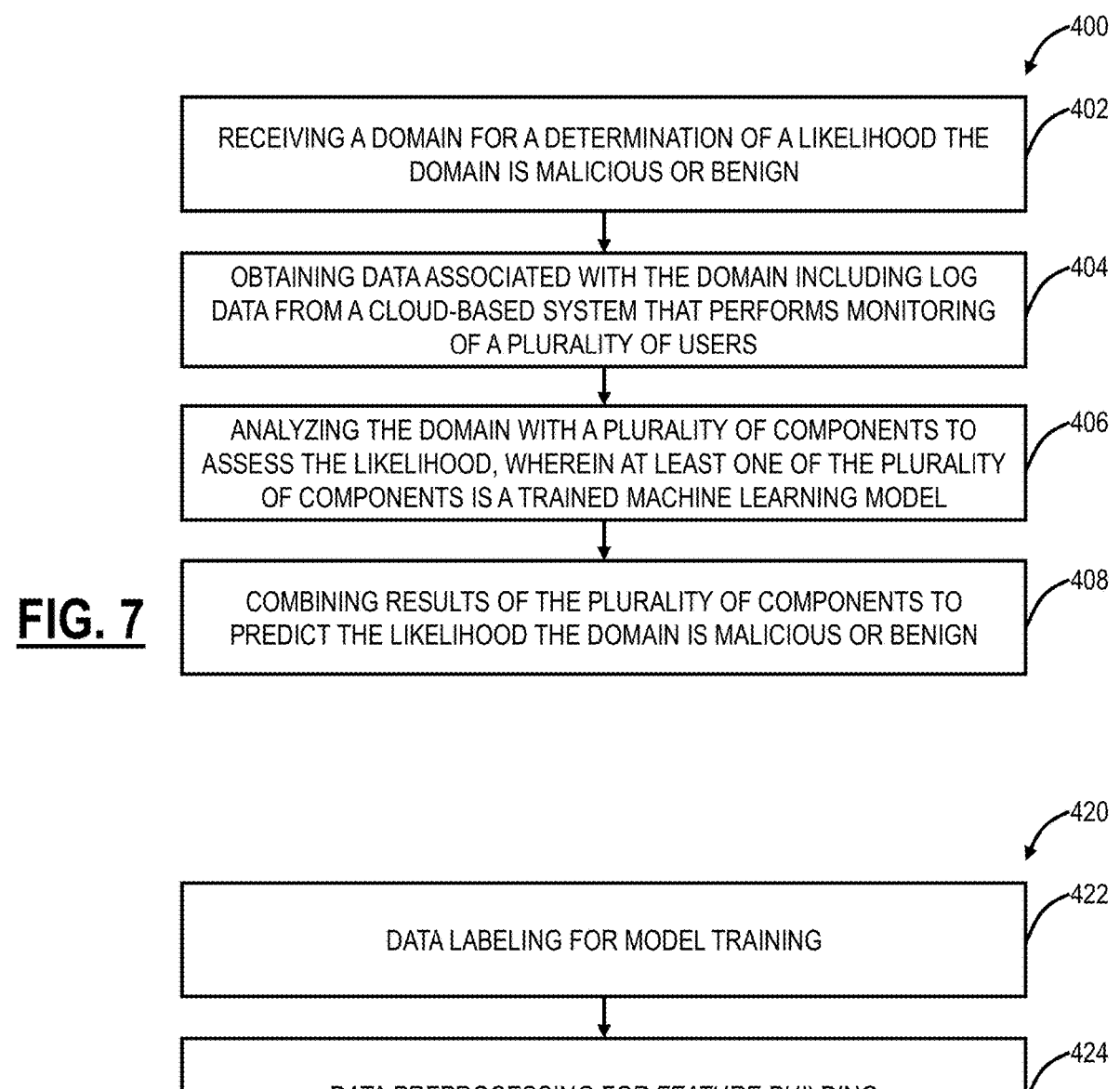

```
                                                        ┌400
┌────────────────────────────────────────────────────┐ ┌402
│ RECEIVING A DOMAIN FOR A DETERMINATION OF A          │
│ LIKELIHOOD THE DOMAIN IS MALICIOUS OR BENIGN         │
└────────────────────────────────────────────────────┘
                         │
┌────────────────────────────────────────────────────┐ ┌404
│ OBTAINING DATA ASSOCIATED WITH THE DOMAIN INCLUDING  │
│ LOG DATA FROM A CLOUD-BASED SYSTEM THAT PERFORMS     │
│ MONITORING OF A PLURALITY OF USERS                   │
└────────────────────────────────────────────────────┘
                         │
┌────────────────────────────────────────────────────┐ ┌406
│ ANALYZING THE DOMAIN WITH A PLURALITY OF COMPONENTS  │
│ TO ASSESS THE LIKELIHOOD, WHEREIN AT LEAST ONE OF    │
│ THE PLURALITY OF COMPONENTS IS A TRAINED MACHINE     │
│ LEARNING MODEL                                       │
└────────────────────────────────────────────────────┘
                         │
┌────────────────────────────────────────────────────┐ ┌408
│ COMBINING RESULTS OF THE PLURALITY OF COMPONENTS TO  │
│ PREDICT THE LIKELIHOOD THE DOMAIN IS MALICIOUS OR    │
│ BENIGN                                               │
└────────────────────────────────────────────────────┘
```

FIG. 7

```
                                                        ┌420
┌────────────────────────────────────────────────────┐ ┌422
│ DATA LABELING FOR MODEL TRAINING                     │
└────────────────────────────────────────────────────┘
                         │
┌────────────────────────────────────────────────────┐ ┌424
│ DATA PREPROCESSING FOR FEATURE BUILDING              │
└────────────────────────────────────────────────────┘
                         │
┌────────────────────────────────────────────────────┐ ┌426
│ FEATURE EXTRACTION AND BUILDING                      │
└────────────────────────────────────────────────────┘
                         │
┌────────────────────────────────────────────────────┐ ┌428
│ SERIALIZING MACHINE LEARNING MODEL                   │
└────────────────────────────────────────────────────┘
```

FIG. 8

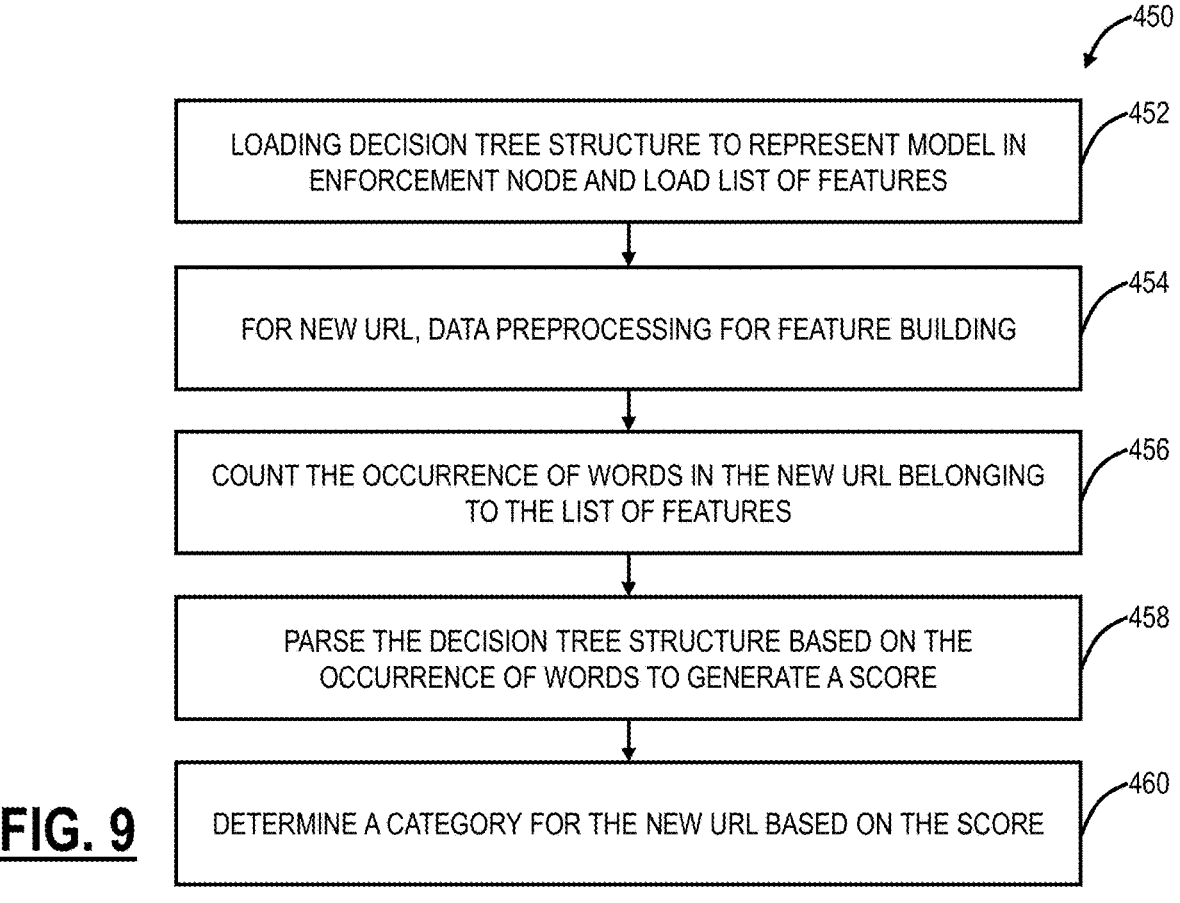

~450

LOADING DECISION TREE STRUCTURE TO REPRESENT MODEL IN ENFORCEMENT NODE AND LOAD LIST OF FEATURES ~452

FOR NEW URL, DATA PREPROCESSING FOR FEATURE BUILDING ~454

COUNT THE OCCURRENCE OF WORDS IN THE NEW URL BELONGING TO THE LIST OF FEATURES ~456

PARSE THE DECISION TREE STRUCTURE BASED ON THE OCCURRENCE OF WORDS TO GENERATE A SCORE ~458

DETERMINE A CATEGORY FOR THE NEW URL BASED ON THE SCORE ~460

FIG. 9

MACHINE LEARNING TO DETERMINE COMMAND AND CONTROL SITES

CROSS-REFERENCE TO RELATED APPLICATION(S)

The present patent application/patent is a continuation-in-part of U.S. patent application Ser. No. 16/889,885, filed Jun. 2, 2020, and entitled "Phishing detection of uncategorized URLs using heuristics and scanning," and a continuation-in-part of U.S. patent application Ser. No. 17/075,991, filed Oct. 21, 2020, and entitled "Utilizing Machine Learning for dynamic content classification of URL content," the contents of each are incorporated by reference herein in their entirety.

FIELD OF THE DISCLOSURE

The present disclosure generally relates to computer networking systems and methods. More particularly, the present disclosure relates to systems and methods for machine learning to determine domain reputation, content classification, phishing sites, and command and control sites.

BACKGROUND OF THE DISCLOSURE

New domains are continually being added, e.g., there can be over 100,000 new domains added every day. Malicious actors are also ever-evolving, with new malicious domains popping up all of the time. In fact, malicious sites, websites, or domains (all these terms may be used interchangeably herein) generally have a very short lifetime since, once caught, they are no longer effective for their goals. Thus, new malicious sites are put up constantly to evade categorization. There are multiple layers of defense to detect malicious sites, such as signature-based detection for Intrusion Prevention Systems (IPS), reputation block based on external/internal threat intelligence feeds, and the like. A reputation block relies on the categorization of a domain and includes an allow and/or block list, i.e., allow benign sites, block known malicious sites, use browser isolation for unknown sites, etc. The reputation block fails to block relatively new malicious sites because threat intelligence feeds usually have non-significant latency and not high enough coverage for the relatively new malicious sites.

A new, uncategorized site may be a malicious or legitimate site, or it may be a legitimate site. One policy may include blocking all new, uncategorized sites. However, this leads to a poor user experience where new legitimate sites are blocked. Another policy may include scanning and detailed analysis of such new, uncategorized sites. However, this leads to latency which also leads to poor user experience. A further policy may include no protection at all, leaving it up to the user to manually identify legitimate or malicious sites. Of course, this approach is ineffective. There is a need to quickly, correctly, and efficiently identify whether a new site is malicious or benign. This is especially important as malicious actors continue to evolve their techniques given high-profile breaches, such as SolarWinds and the like.

BRIEF SUMMARY OF THE DISCLOSURE

The present disclosure relates to systems and methods for machine learning to determine domain reputation, content classification, phishing sites, and command and control sites. The present disclosure utilizes machine learning to classify a new, unknown site based on its likelihood the site is malicious or benign. A reputation score is determined based on various inputs. This determination can be performed in near real-time with a user request for the new, unknown site. Various actions can be taken based on the reputation score, such as phishing site detection, Command and Control (C2) detection, smart browser isolation, human intervention and review, and the like. Advantageously, this approach provides a quick, correct, and efficient identification of whether a new site is malicious or benign, providing protection for new domains.

BRIEF DESCRIPTION OF THE DRAWINGS

The present disclosure is illustrated and described herein with reference to the various drawings, in which like reference numbers are used to denote like system components/method steps, as appropriate, and in which:

FIG. 3 is a block diagram of a server that may be used in the cloud-based system of FIGS. 1 and 2 or the like.

FIG. 7 is a flowchart of a domain reputation process.

FIG. 8 is a flowchart of a model training process.

FIG. 9 is a flowchart of a URL content classification process.

DETAILED DESCRIPTION OF THE DISCLOSURE

Again, the present disclosure relates to systems and methods for machine learning to determine domain reputation, content classification, phishing sites, and command and control sites. The present disclosure utilizes machine learning to classify a new, unknown site based on its likelihood the site is malicious or benign. A reputation score is determined based on various inputs. This determination can be performed in near real-time with a user request for the new, unknown site. Various actions can be taken based on the reputation score, such as phishing site detection, Command and Control (C2) detection, smart browser isolation, human intervention and review, and the like. Advantageously, this approach provides a quick, correct, and efficient identification of whether a new site is malicious or benign, providing protection for new domains.

Example Cloud-Based System Architecture

Figure 1:
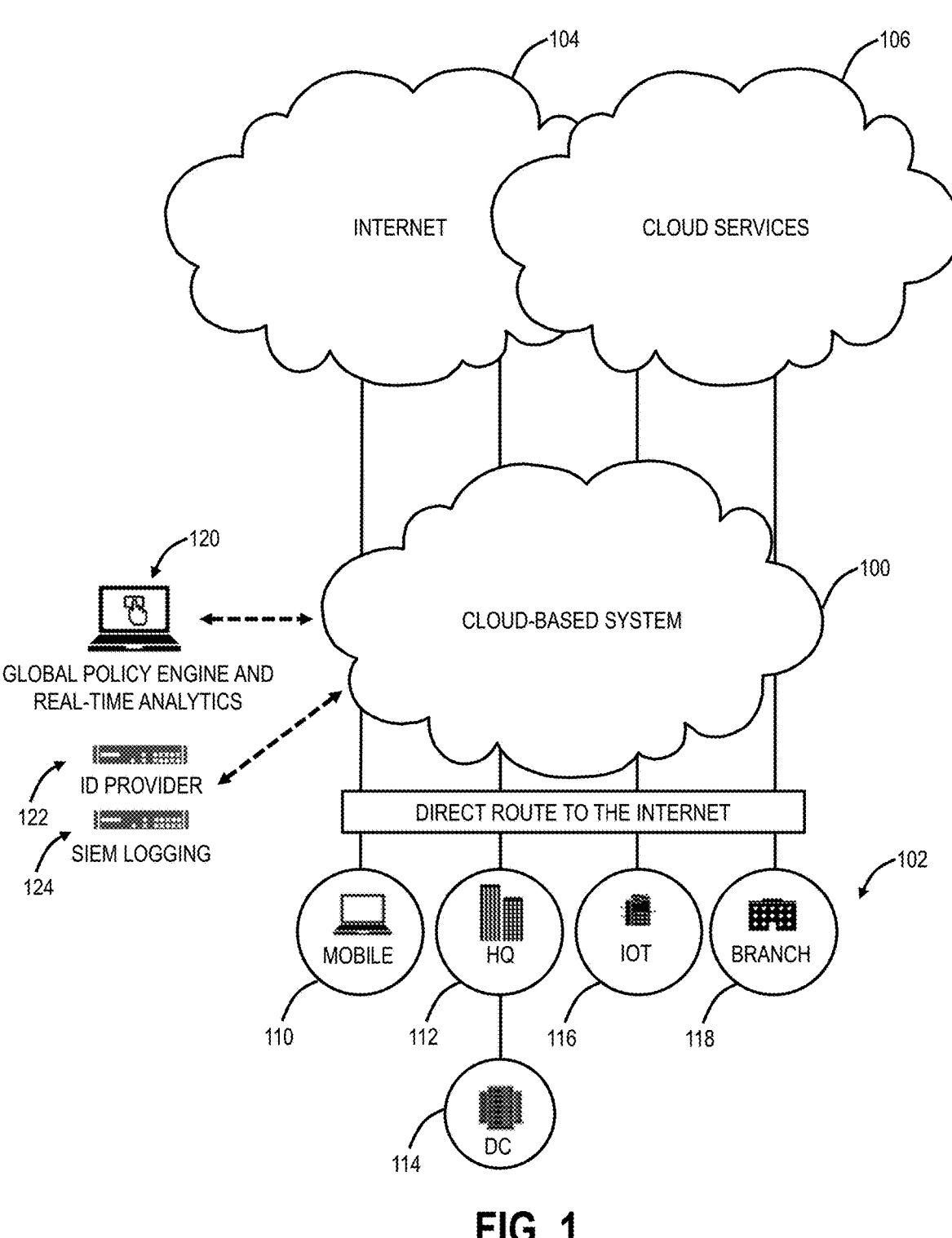
FIG. 1 is a network diagram of a cloud-based system offering security as a service.

FIG. 1 is a network diagram of a cloud-based system 100 offering security as a service. Specifically, the cloud-based system 100 can offer a Secure Internet and Web Gateway as a service to various users 102, as well as other cloud services. In this manner, the cloud-based system 100 is located between the users 102 and the Internet as well as any cloud services 106 (or applications) accessed by the users 102. As such, the cloud-based system 100 provides inline monitoring inspecting traffic between the users 102, the Internet 104, and the cloud services 106, including Secure Sockets Layer (SSL) traffic. The cloud-based system 100 can offer access control, threat prevention, data protection, etc. The access control can include a cloud-based firewall, cloud-based intrusion detection, Uniform Resource Locator (URL) filtering, bandwidth control, Domain Name System (DNS) filtering, etc. The threat prevention can include cloud-based intrusion prevention, protection against advanced threats (malware, spam, Cross-Site Scripting (XSS), phishing, etc.), cloud-based sandbox, antivirus, DNS security, etc. The data protection can include Data Loss Prevention (DLP), cloud application security such as via Cloud Access Security Broker (CASB), file type control, etc. The traffic inspection applies a variety of security features on the traffic, such as in an ordered manner, with the traffic being allowed if it passes all of the security features.

The cloud-based firewall can provide Deep Packet Inspection (DPI) and access controls across various ports and protocols as well as being application and user aware. The URL filtering can block, allow, or limit website access based on policy for a user, group of users, or entire organization, including specific destinations or categories of URLs (e.g., gambling, social media, etc.). The bandwidth control can enforce bandwidth policies and prioritize critical applications such as relative to recreational traffic. DNS filtering can control and block DNS requests against known and malicious destinations.

The cloud-based intrusion prevention and advanced threat protection can deliver full threat protection against malicious content such as browser exploits, scripts, identified botnets and malware callbacks, etc. The cloud-based sandbox can block zero-day exploits (just identified) by analyzing unknown files for malicious behavior. Advantageously, the cloud-based system 100 is multi-tenant and can service a large volume of the users 102. As such, newly discovered threats can be promulgated throughout the cloud-based system 100 for all tenants practically instantaneously. The antivirus protection can include antivirus, antispyware, anti-malware, etc., protection for the users 102, using signatures sourced and constantly updated. The DNS security can identify and route command-and-control connections to threat detection engines for full content inspection.

The DLP can use standard and/or custom dictionaries to continuously monitor the users 102, including compressed and/or SSL-encrypted traffic. Again, being in a cloud implementation, the cloud-based system 100 can scale this monitoring with near-zero latency on the users 102. The cloud application security can include CASB functionality to discover and control user access to known and unknown cloud services 106. The file type controls enable true file type control by the user, location, destination, etc. to determine which files are allowed or not.

Figure 3:
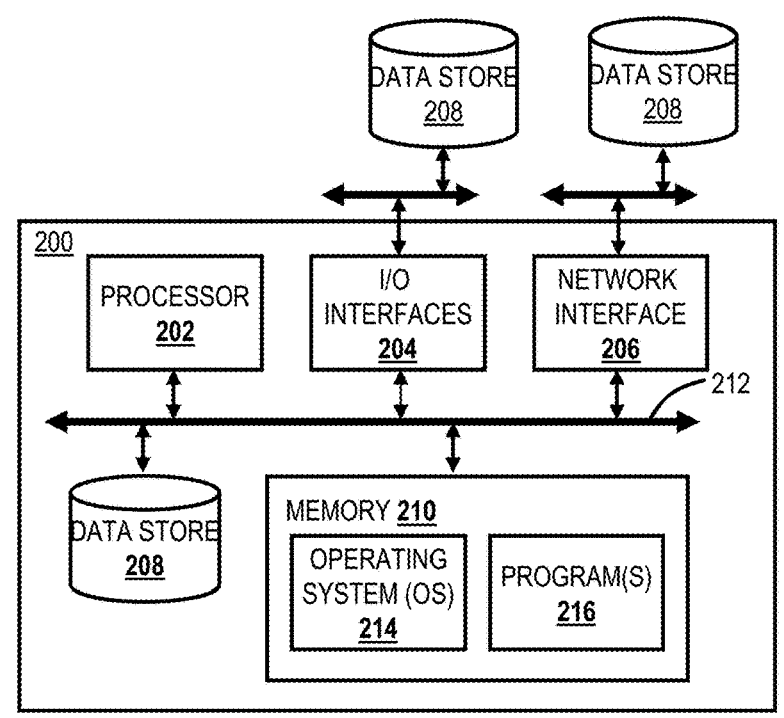

For illustration purposes, the users 102 of the cloud-based system 100 can include a mobile device 110, a headquarters (H.Q.) 112 which can include or connect to a data center (DC) 114, Internet of Things (IoT) devices 116, a branch office/remote location 118, etc., and each includes one or more user devices (an example user device 300 is illustrated in FIG. 3). The devices 110, 116, and the locations 112, 114, 118 are shown for illustrative purposes, and those skilled in the art will recognize there are various access scenarios and other users 102 for the cloud-based system 100, all of which are contemplated herein. The users 102 can be associated with a tenant, which may include an enterprise, a corporation, an organization, etc. That is, a tenant is a group of users who share a common access with specific privileges to the cloud-based system 100, a cloud service, etc. In an embodiment, the headquarters 112 can include an enterprise's network with resources in the data center 114. The mobile device 110 can be a so-called road warrior, i.e., users that are off-site, on-the-road, etc.

Further, the cloud-based system 100 can be multi-tenant, with each tenant having its own users 102 and configuration, policy, rules, etc. One advantage of the multi-tenancy and a large volume of users is the zero-day/zero-hour protection in that a new vulnerability can be detected and then instantly remediated across the entire cloud-based system 100. The same applies to policy, rule, configuration, etc. changes—they are instantly remediated across the entire cloud-based system 100. As well, new features in the cloud-based system 100 can also be rolled up simultaneously across the user base, as opposed to selective and time-consuming upgrades on every device at the locations 112, 114, 118, and the devices 110, 116.

Logically, the cloud-based system 100 can be viewed as an overlay network between users (at the locations 112, 114, 118, and the devices 110, 106) and the Internet 104 and the cloud services 106. Previously, the I.T. deployment model included enterprise resources and applications stored within the data center 114 (i.e., physical devices) behind a firewall (perimeter), accessible by employees, partners, contractors, etc. on-site or remote via Virtual Private Networks (VPNs), etc. The cloud-based system 100 is replacing the conventional deployment model. The cloud-based system 100 can be used to implement these services in the cloud without requiring the physical devices and management thereof by enterprise I.T. administrators. As an ever-present overlay network, the cloud-based system 100 can provide the same functions as the physical devices and/or appliances regardless of geography or location of the users 102, as well as independent of platform, operating system, network access technique, network access provider, etc.

There are various techniques to forward traffic between the users 102 at the locations 112, 114, 118, and via the devices 110, 116, and the cloud-based system 100. Typically, the locations 112, 114, 118 can use tunneling where all traffic is forward through the cloud-based system 100. For example, various tunneling protocols are contemplated, such as Generic Routing Encapsulation (GRE), Layer Two Tunneling Protocol (L2TP), Internet Protocol (I.P.) Security (IPsec), customized tunneling protocols, etc. The devices 110, 116, when not at one of the locations 112, 114, 118 can use a local application that forwards traffic, a proxy such as via a Proxy Auto-Config (PAC) file, and the like. A key aspect of the cloud-based system 100 is all traffic between the users 102 and the Internet 104 or the cloud services 106 is via the cloud-based system 100. As such, the cloud-based system 100 has visibility to enable various functions, all of which are performed off the user device in the cloud.

The cloud-based system 100 can also include a management system 120 for tenant access to provide global policy and configuration as well as real-time analytics. This enables I.T. administrators to have a unified view of user activity, threat intelligence, application usage, etc. For example, I.T. administrators can drill-down to a per-user level to understand events and correlate threats, to identify compromised devices, to have application visibility, and the like. The cloud-based system 100 can further include connectivity to an Identity Provider (IDP) 122 for authentication of the users 102 and to a Security Information and Event Management (SIEM) system 124 for event logging. The system 124 can provide alert and activity logs on a per-user 102 basis.

Figure 2:
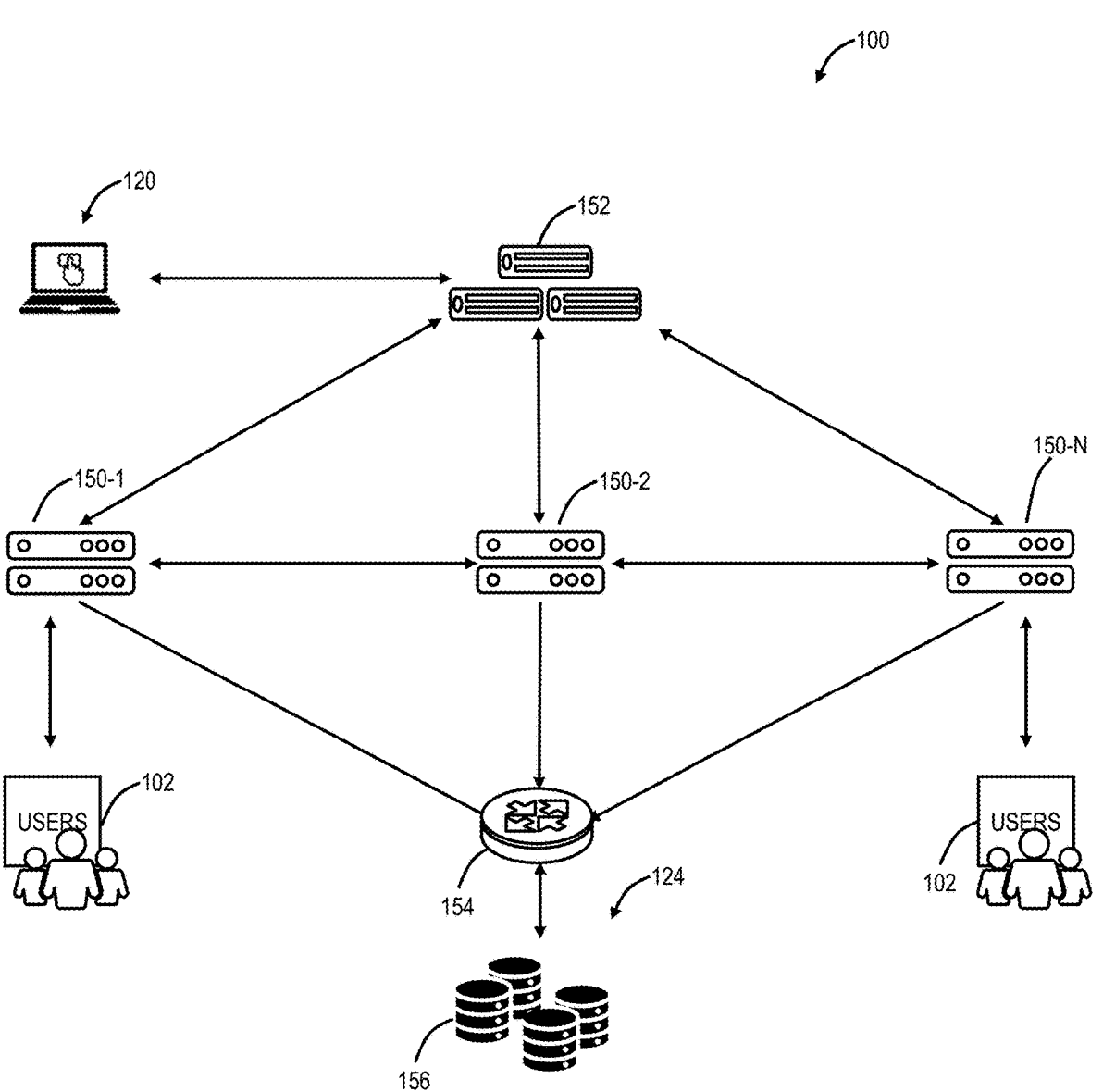
FIG. 2 is a network diagram of an example implementation of the cloud-based system.

FIG. 2 is a network diagram of an example implementation of the cloud-based system 100. In an embodiment, the cloud-based system 100 includes a plurality of enforcement nodes (EN) 150, labeled as enforcement nodes 150-1, 150-2, 150-N, interconnected to one another and interconnected to a central authority (CA) 152. The nodes 150, 152, while described as nodes, can include one or more servers, including physical servers, virtual machines (V.M.) executed on physical hardware, etc. An example of a server is illustrated in FIG. 2. The cloud-based system 100 further includes a log router 154 that connects to a storage cluster 156 for supporting log maintenance from the enforcement nodes 150. The central authority 152 provides centralized policy, real-time threat updates, etc. and coordinates the distribution of this data between the enforcement nodes 150. The enforcement nodes 150 provide an onramp to the users 102 and are configured to execute policy, based on the central authority 152, for each user 102. The enforcement nodes 150 can be geographically distributed, and the policy for each user 102 follows that user 102 as he or she connects to the nearest (or other criteria) enforcement node 150. Of note, the cloud-based system is an external system meaning it is separate from tenant's private networks (enterprise networks) as well as from networks associated with the devices 110, 116, and locations 112, 118.

The enforcement nodes 150 are full-featured secure internet gateways that provide integrated internet security. They inspect all web traffic bi-directionally for malware and enforce security, compliance, and firewall policies, as described herein. In an embodiment, each enforcement node 150 has two main modules for inspecting traffic and applying policies: a web module and a firewall module. The enforcement nodes 150 are deployed around the world and can handle hundreds of thousands of concurrent users with millions/billions of concurrent sessions. Because of this, regardless of where the users 102 are, they can access the Internet 104 from any device, and the enforcement nodes 150 protect the traffic and apply corporate policies. The enforcement nodes 150 can implement various inspection engines therein, and optionally, send sandboxing to another system. The enforcement nodes 150 include significant fault tolerance capabilities, such as deployment in active-active mode to ensure availability and redundancy as well as continuous monitoring.

In an embodiment, customer traffic is not passed to any other component within the cloud-based system 100, and the enforcement nodes 150 can be configured never to store any data to disk. Packet data is held in memory for inspection and then, based on policy, is either forwarded or dropped. Log data generated for every transaction is compressed, tokenized, and exported over secure TLS connections to the log routers 154 that direct the logs to the storage cluster 156, hosted in the appropriate geographical region, for each organization. In an embodiment, all data destined for or received from the Internet is processed through one of the enforcement nodes 150. In another embodiment, specific data specified by each tenant, e.g., only email, only executable files, etc., is process through one of the enforcement nodes 150.

Each of the enforcement nodes 150 may generate a decision vector D=[d1, d2, . . . , dn] for a content item of one or more parts C=[c1, c2, . . . , cm]. Each decision vector may identify a threat classification, e.g., clean, spyware, malware, undesirable content, innocuous, spam email, unknown, etc. For example, the output of each element of the decision vector D may be based on the output of one or more data inspection engines. In an embodiment, the threat classification may be reduced to a subset of categories, e.g., violating, non-violating, neutral, unknown. Based on the subset classification, the enforcement node 150 may allow the distribution of the content item, preclude distribution of the content item, allow distribution of the content item after a cleaning process, or perform threat detection on the content item. In an embodiment, the actions taken by one of the enforcement nodes 150 may be determinative on the threat classification of the content item and on a security policy of the tenant to which the content item is being sent from or from which the content item is being requested by. A content item is violating if, for any part C=[c1, c2, . . . , cm] of the content item, at any of the enforcement nodes 150, any one of the data inspection engines generates an output that results in a classification of "violating."

The central authority 152 hosts all customer (tenant) policy and configuration settings. It monitors the cloud and provides a central location for software and database updates and threat intelligence. Given the multi-tenant architecture, the central authority 152 is redundant and backed up in multiple different data centers. The enforcement nodes 150 establish persistent connections to the central authority 152 to download all policy configurations. When a new user connects to an enforcement node 150, a policy request is sent to the central authority 152 through this connection. The central authority 152 then calculates the policies that apply to that user 102 and sends the policy to the enforcement node 150 as a highly compressed bitmap.

The policy can be tenant-specific and can include access privileges for users, websites and/or content that is disallowed, restricted domains, DLP dictionaries, etc. Once downloaded, a tenant's policy is cached until a policy change is made in the management system 120. The policy can be tenant-specific and can include access privileges for users, websites and/or content that is disallowed, restricted domains, DLP dictionaries, etc. When this happens, all of the cached policies are purged, and the enforcement nodes 150 request the new policy when the user 102 next makes a request. In an embodiment, the enforcement node 150 exchange "heartbeats" periodically, so all enforcement nodes 150 are informed when there is a policy change. Any enforcement node 150 can then pull the change in policy when it sees a new request.

The cloud-based system 100 can be a private cloud, a public cloud, a combination of a private cloud and a public cloud (hybrid cloud), or the like. Cloud computing systems and methods abstract away physical servers, storage, networking, etc., and instead offer these as on-demand and elastic resources. The National Institute of Standards and Technology (NIST) provides a concise and specific definition which states cloud computing is a model for enabling convenient, on-demand network access to a shared pool of configurable computing resources (e.g., networks, servers, storage, applications, and services) that can be rapidly provisioned and released with minimal management effort or service provider interaction. Cloud computing differs from the classic client-server model by providing applications from a server that are executed and managed by a client's web browser or the like, with no installed client version of an application required. Centralization gives cloud service providers complete control over the versions of the browser-based and other applications provided to clients, which removes the need for version upgrades or license management on individual client computing devices. The phrase "Software as a Service" (SaaS) is sometimes used to describe application programs offered through cloud computing. A common shorthand for a provided cloud computing service (or even an aggregation of all existing cloud services) is "the cloud." The cloud-based system 100 is illustrated herein as an example embodiment of a cloud-based system, and other implementations are also contemplated.

As described herein, the terms cloud services and cloud applications may be used interchangeably. The cloud service 106 is any service made available to users on-demand via the Internet, as opposed to being provided from a company's on-premises servers. A cloud application, or cloud app, is a software program where cloud-based and local components work together. The cloud-based system 100 can be utilized to provide example cloud services, including Zscaler Internet Access (ZIA), Zscaler Private Access (ZPA), and Zscaler Digital Experience (ZDX), all from Zscaler, Inc. (the assignee and applicant of the present application). The ZIA service can provide the access control, threat prevention, and data protection described above with reference to the cloud-based system 100. ZPA can include access control, micro-service segmentation, etc. The ZDX service can provide monitoring of user experience, e.g., Quality of Experience (QoE), Quality of Service (QoS), etc., in a manner that can gain insights based on continuous, inline monitoring. For example, the ZIA service can provide a user with Internet Access, and the ZPA service can provide a user with access to enterprise resources instead of traditional Virtual Private Networks (VPNs), namely ZPA provides Zero Trust Network Access (ZTNA). Those of ordinary skill in the art will recognize various other types of cloud services 106 are also contemplated. Also, other types of cloud architectures are also contemplated, with the cloud-based system 100 presented for illustration purposes.

Example Server Architecture

FIG. 3 is a block diagram of a server 200, which may be used in the cloud-based system 100, in other systems, or standalone. For example, the enforcement nodes 150 and the central authority 152 may be formed as one or more of the servers 200. The server 200 may be a digital computer that, in terms of hardware architecture, generally includes a processor 202, input/output (I/O) interfaces 204, a network interface 206, a data store 208, and memory 210. It should be appreciated by those of ordinary skill in the art that FIG. 3 depicts the server 200 in an oversimplified manner, and a practical embodiment may include additional components and suitably configured processing logic to support known or conventional operating features that are not described in detail herein. The components (202, 204, 206, 208, and 210) are communicatively coupled via a local interface 212. The local interface 212 may be, for example, but not limited to, one or more buses or other wired or wireless connections, as is known in the art. The local interface 212 may have additional elements, which are omitted for simplicity, such as controllers, buffers (caches), drivers, repeaters, and receivers, among many others, to enable communications. Further, the local interface 212 may include address, control, and/or data connections to enable appropriate communications among the aforementioned components.

The processor 202 is a hardware device for executing software instructions. The processor 202 may be any custom made or commercially available processor, a Central Processing Unit (CPU), an auxiliary processor among several processors associated with the server 200, a semiconductor-based microprocessor (in the form of a microchip or chip-set), or generally any device for executing software instructions. When the server 200 is in operation, the processor 202 is configured to execute software stored within the memory 210, to communicate data to and from the memory 210, and to generally control operations of the server 200 pursuant to the software instructions. The I/O interfaces 204 may be used to receive user input from and/or for providing system output to one or more devices or components.

The network interface 206 may be used to enable the server 200 to communicate on a network, such as the Internet 104. The network interface 206 may include, for example, an Ethernet card or adapter or a Wireless Local Area Network (WLAN) card or adapter. The network interface 206 may include address, control, and/or data connections to enable appropriate communications on the network. A data store 208 may be used to store data. The data store 208 may include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof.

Moreover, the data store 208 may incorporate electronic, magnetic, optical, and/or other types of storage media. In one example, the data store 208 may be located internal to the server 200, such as, for example, an internal hard drive connected to the local interface 212 in the server 200. Additionally, in another embodiment, the data store 208 may be located external to the server 200 such as, for example, an external hard drive connected to the I/O interfaces 204 (e.g., SCSI or USB connection). In a further embodiment, the data store 208 may be connected to the server 200 through a network, such as, for example, a network-attached file server.

The memory 210 may include any of volatile memory elements (e.g., random access memory (RAM, such as DRAM, SRAM, SDRAM, etc.)), nonvolatile memory elements (e.g., ROM, hard drive, tape, CDROM, etc.), and combinations thereof. Moreover, the memory 210 may incorporate electronic, magnetic, optical, and/or other types of storage media. Note that the memory 210 may have a distributed architecture, where various components are situated remotely from one another but can be accessed by the processor 202. The software in memory 210 may include one or more software programs, each of which includes an ordered listing of executable instructions for implementing logical functions. The software in the memory 210 includes a suitable Operating System (O/S) 214 and one or more programs 216. The operating system 214 essentially controls the execution of other computer programs, such as the one or more programs 216, and provides scheduling, input-output control, file and data management, memory management, and communication control and related services. The one or more programs 216 may be configured to implement the various processes, algorithms, methods, techniques, etc. described herein.

Domain Detection System

Figure 4:
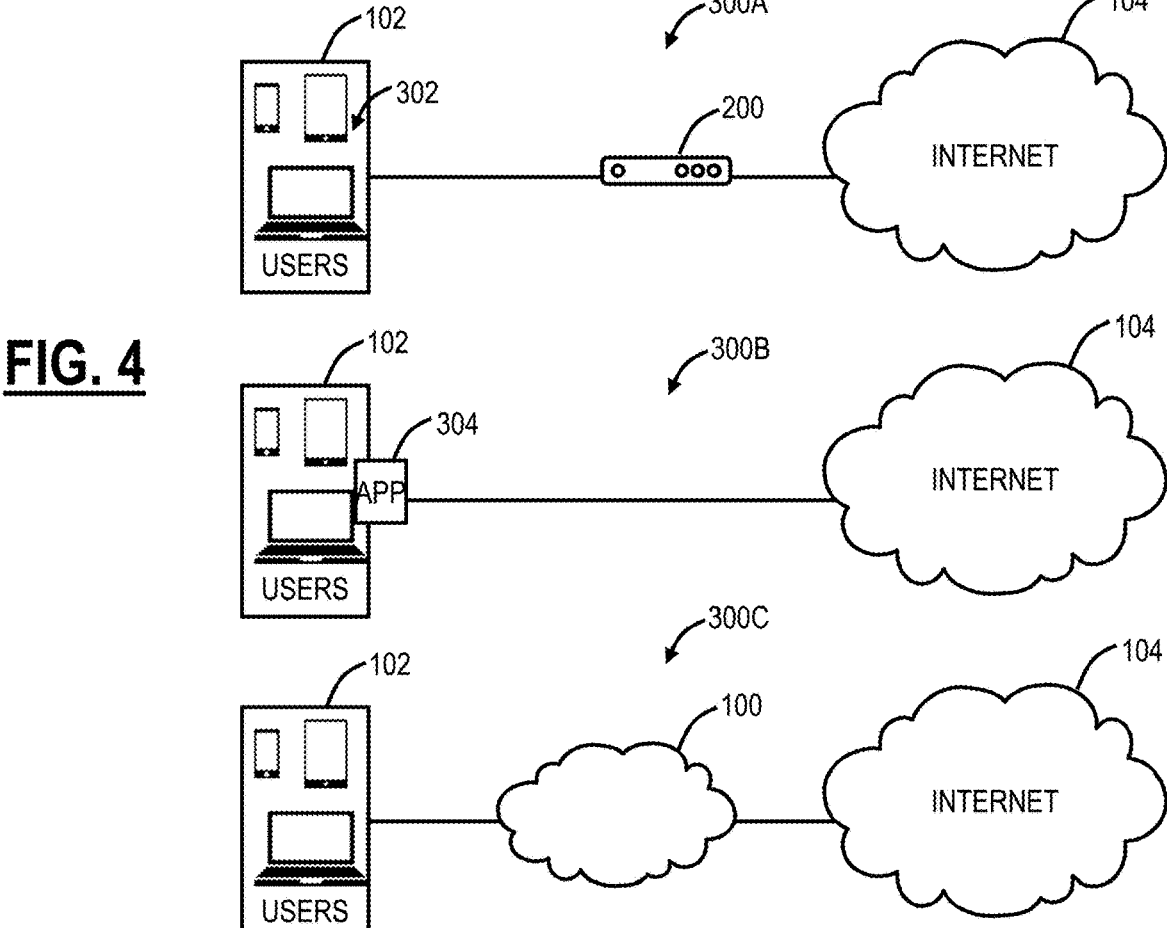
FIG. 4 is a network diagram of three example network configurations of malicious domain detection between a user (each having a user device) and the Internet.

FIG. 4 is a network diagram of three example network configurations 300A, 300B, 300C of malicious domain detection between a user 102 (each having a user device 302) and the Internet 104. The objective of the malicious domain detection is to identify a URL requested by the user 102 as malicious or benign, and to block and/or flag malicious URLs and allow benign URLs. For example, the malicious URLs can be physically blocked so that the user 102 is unable to access these sites. Alternatively, the malicious URLs can be flagged to the user, e.g., "this site is a potential phishing/malicious site," allowing the user to proceed with caution. In a further embodiment, the malicious URLs can be loaded in isolation. Those skilled in the art will recognize the example network configurations 300A, 300B, 300C are described herein for illustration purposes and the phishing detection contemplates use in other approaches.

The network configuration 300A includes a server 200 located between the user 102 and the Internet 104. For example, the server 200 can be a proxy, a gateway, a Secure Web Gateway (SWG), Secure Internet and Web Gateway, etc. The server 200 is illustrated located inline with the user 102 and configured to monitor URL requests for malicious domain detection and remediation. In other embodiments, the server 200 does not have to be inline. For example, the server 200 can monitor the URL requests and provide feedback to the user 102 or specific actions to the user device 302. The server 200 can be on a local network associated with the user 102 as well as external, such as on the Internet 104. The network configuration 300B includes an application 304 that is executed on the user device 302. The application 304 can perform the same functionality as the server 200, as well as coordinated functionality with the server 200. Finally, the network configuration 300C includes a cloud service such as through the cloud-based system 100 configured to monitor the user 102 and perform the malicious domain detection. Of course, various embodiments are contemplated herein, including combinations of the network configurations 300A, 300B, 300C together.

The overall objective of the malicious domain detection includes identifying whether or not a URL is a malicious or benign site and allowing/blocking/alerting based thereon. To that end, the malicious domain detection can include the maintenance of a block list that includes all URLs categorized as malicious. The malicious domain detection can add newly categorized sites to this list as well. For example, the application 302 may be a browser add-in or agent that prohibits access to any sites in the list. Also, the cloud-based system 100 can block/allow/isolate requests based on the categorization.

Machine Learning in Network Security

Machine learning can be used in various applications, including malware detection, intrusion detection, threat classification, the user or content risk, detecting malicious clients or bots, etc. In a particular use case in the present disclosure, machine learning can be used to analyze a new domain. That is, a machine learning model is built and trained as described herein to determine the likelihood a new domain is benign or malicious. As described here, the typical machine learning training process collects data samples with labels (benign or malicious), extracts a set of features from these samples, and feeds the features into a machine learning model to determine patterns. The output of this training process is a machine learning model that can predict the likelihood a new domain is benign or malicious, in production.

Domain Reputation

An input of the malicious domain detection can be a domain reputation database that includes the categorization of sites. This can also be a service that can classify new domains helping with threat detection to identify if a given domain is likely to be malicious. Note that the word "likely" is emphasized because the focus is on the unknown threats; if a domain is known to be bad (because it was associated with a known threat for example) then it should have been blocked already, i.e., already in the domain reputation database.

An objective of the present disclosure is to determine a reputation score that reflects the likelihood of a good domain (or malicious domain). For example, a score between 0 and 100 with a lower score means more likely to be bad. The reputation score can be used in combination with other techniques as described herein, such as phishing site detection, C2 detection, smart browser isolation, and the like.

There is a need for data, for training and production. Regarding the data, below are some relevant data sources that can be used herewith.

The WHOIS database contains all registered domain names and is publicly available. The WHOIS database includes the contact information of the registrant, nameservers, various dates, and the like.

A passive DNS database includes historical DNS records and may be obtained via third-parties.

One important data source is the logs from the cloud-based system 100, stored in the storage cluster 156. The cloud-based system 100 is multi-tenant and supports the security monitoring of millions of users. For example, the cloud-based system 100 can monitor hundreds of billions of transactions every day for many different tenants (organizations). The storage cluster 156 can contain the browsing history of all of the users 102. This is a large amount of data that can be leveraged in machine learning.

further data source can be external databases of known malicious sites, e.g., threat intelligence feeds, or URLs extracted from known malwares.

Domain Reputation Flow

Figure 5:
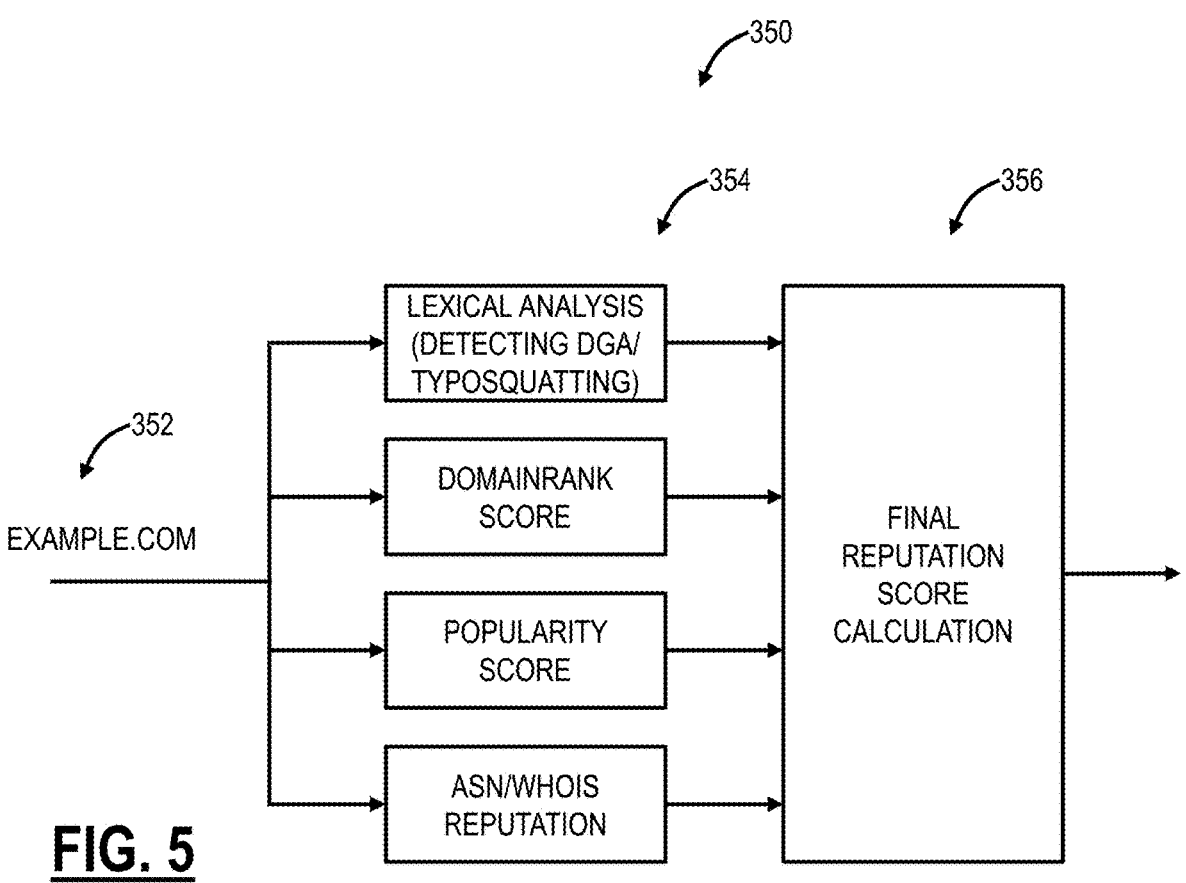
FIG. 5 is a flow diagram of a domain reputation process that is configured to provide a score of the likelihood a given domain is malicious or benign.

FIG. 5 is a flow diagram of a domain reputation process 350 that is configured to provide a score of the likelihood a given domain 352 is malicious or benign. The domain reputation process 350 receives the domain 352 (e.g., example.com) and analyzes the domain 352 with a plurality of components 354 to calculate a reputation score 356. The components 354 can include lexical analysis (including Domain Generation Algorithm (DGA) detection and typosquatting detection), DomainRank reputation, popularity reputation, and historical Autonomous System Number (ASN)/WHOIS reputation; then their outputs are combined to get the final reputation score 356.

While DGA and typosquatting detection can be ML models that just do prediction, the other components might involve a database lookup. Of course, the domain reputation process 350 does not have to be limited to only these four components 354, could include a subset of these components 354, could include additional components.

DGA Detection

The goal of this component is to determine if the domain (or part of the domain) was generated by a Domain Generating Algorithm (DGA). DGA algorithms are seen in various families of malware that are used to periodically generate a large number of domain names that can be used as rendezvous points with their C2 servers. For example, an infected computer could create thousands of domain names such as: www.<gibberish>.com and would attempt to contact a portion of these with the purpose of receiving an update or commands.

DGA domain names can be blocked using blacklists, but the coverage of these blacklists is either poor (public blacklists) or wildly inconsistent (commercial vendor blacklists). Detection techniques belong in two main classes: reactionary and real-time. Reactionary detection relies on non-supervised clustering techniques and contextual information like network NXDOMAIN responses, WHOIS information, and passive DNS to make an assessment of domain name legitimacy. Recent attempts at detecting DGA domain names with deep learning techniques have been extremely successful, with F1 scores of over 99%. These deep learning methods typically utilize Long Short-Term Memory (LSTM) and Convolutional Neural Network (CNN) architectures, though deep word embeddings have shown great promise for detecting dictionary DGA.

DGA detection can be formulated as a ML problem, where the negative labeled data (non-DGA) is obtained from the storage cluster 156 and the positive labeled data (DGA) is obtained from the known DGAs. The cloud-based system 100 has the advantage of having a large data set of non-DGA data, and this can be combined with the positive labeled data (DGA).

Typosquatting Detection

The goal of this component is to determine if the domain (or part of the domain) was a typosquatting one. As is known in the art, typosquatting is where a possibly malicious site mimics a real site through typos, adding letters, combining words, omitting periods, extra periods, appending terms, etc. For example, example.com is a legitimate site where exemple.com could be typosquatting.

Similar to the DGA detection, this can be formulated as an ML problem, where the negative labeled data (non-typosquatting) is obtained from the storage cluster 156 and the positive labeled data (typosquatting) is obtained from some available phishing datasets.

DomainRank

PageRank is an algorithm used by Google search to rank web pages in search engine results. PageRank works by counting the number and quality of links to a page to determine a rough estimate of how important the website is. The underlying assumption is that more important websites are likely to receive more links from other websites. This is also similar to patent valuation based on the number of future citations, namely the more valuable a patent, the more citations it would have in the future. For example, PageRank is described in U.S. Pat. No. 6,285,999—Sep. 4, 2001, the contents of which are incorporate by reference.

The present disclosure proposes a related concept referred to herein as DomainRank. The idea behind the popularity is that a good reputed domain is good because many users have visited it for quite some time. On the other hand, a bad reputed domain will be bad because of links pointing to known bad domains. Note that the number of domains is much less than the number of web pages and tweaked for the security purpose. That is, the present disclosure can treat each domain (in the WHOIS database) as a node in a graph, then crawl the web and put a directed edge if there is a link from any page of one domain to another domain. Then we run the PageRank algorithm on the graph to get the ranks of the domains and use them as reputation scores. The PageRank algorithm can be adjusted to take into account whether the domain has links pointing to known bad domains. This approach only punishes a domain if it has links pointing to known bad domains, but not the other way around; for example, a phishing site can have links pointing to legitimate domains—those legitimate domains should not be punished by that.

Popularity

The idea behind the popularity is a good reputed domain is good because many users have visited me for quite some time. Again, using the vast log data of the cloud-based system 100, it is possible to measure the popularity of a domain by counting the number of hits on the domain over time, and use it as the basis for the reputation score. No machine learning is needed here, but some analysis is still needed to decide how to do normalization, how to incorporate the decayed factor, etc. That is, there are two dimensions here—number of hits and time. The time should be valued more in recent time.

ASN/WHOIS Historical Reputation

The idea behind historical reputation is that a bad reputed domain may be bad if it is associated with an entity that has been involved with malicious activity in the past. The associated entity can be either an ASN or a DNS provider/server or a Domain registrar/registrant. This approach would need the passive DNS and/or malware data to get the statistics. The age of the domain (gotten from WHOIS information) can also be taken into account. Again, no machine learning is needed here, but some analysis is still needed to decide how to do normalization, how to incorporate the decayed factor, etc.

Final Reputation Score Calculation

Figure 6:
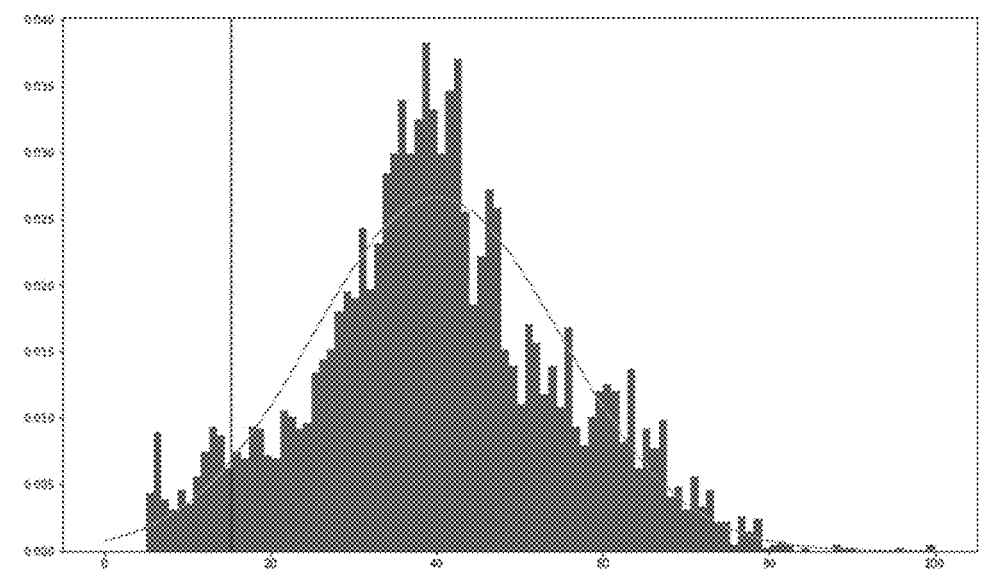
FIG. 6 is a graph of suspicious domains based on their reputation score showing a Gaussian distribution.

The final domain reputation score 356 can be calculated as the combination of some or all of the above components' scores. It is also possible to automatically adjust the weights of these scores to make sure that the final reputation scores follow a Gaussian distribution (as in FIG. 6). This will allow setting a threshold to control the fraction of "suspicious" domains to be sent for further analysis.

Domain Reputation Process

FIG. 7 is a flowchart of a domain reputation process 400. The domain reputation process 400 contemplates implementation as a computer-implemented method, as instructions embodied in a non-transitory computer-readable medium, and via a processing device such as the server 200.

The domain reputation process 400 includes receiving a domain for a determination of a likelihood the domain is malicious or benign (step 402); obtaining data associated with the domain including log data from a cloud-based system 100 that performs monitoring of a plurality of users 102 (step 404); analyzing the domain with a plurality of components to assess the likelihood, wherein at least one of the plurality of components is a trained machine learning model (step 406); and combining results of the plurality of components to predict the likelihood the domain is malicious or benign (step 408).

The domain reputation process 400 can be utilized as an initial layer in multiple layers of defense in detecting new malicious websites. Responsive to the likelihood the domain is malicious, the domain reputation process 400 can include performing an action. The action can be causing a block of the domain or causing the domain to be loaded in isolation, e.g., loading the domain in a browser isolation session.

The action can be determining whether the domain is a phishing site based on analyzing features of a Uniform Resource Locator (URL) of the domain and loading the URL to determine the legitimacy of the domain. For example, the phishing site can be determined using the phishing detection process 700.

The action can be determining whether the domain is a command and control (C2) site based on an ensemble of a plurality of models. For example, the C2 site can be determined using the C2 detection process 600.

The plurality of components can include lexical analysis, a domain reputation, a popularity reputation, and a historical reputation, such as described in the domain reputation process 350. The plurality of components can include a domain reputation that uses a directed graph analysis to rank the domain based on a number of links pointing to it and on a number of links in the domain pointing to known bad domains.

The trained machine learning model can be trained using labeled log data from the cloud-based system. The domain reputation process 400 can include adjusting the combining results of the plurality of components such that reputation scores for a plurality of domains follow a Gaussian distribution.

Dynamic Content Categorization

Also, the present disclosure relates to systems and methods utilizing Machine Learning (ML) for dynamic content classification, such as for use in a cloud-based security system for allowing/blocking Web requests based on the classified content. The present disclosure relates to building an ML classifier for URLs to determine the content of URLs, specifically focusing on data labeling, data preprocessing for feature building, feature extraction and building, serializing a model into a flat buffer decision tree structure, and using the flat buffer decision tree structure on production data to classify new URLs. This enables new URL content to be accurately and efficiently categorized, and once categorized, a cloud service and use the classifications to allow/block requests from users.

The present disclosure includes a machine learning technique to classify a Web page as containing content related to one of a plurality of categories. This is advantageous as new URL content is ever-evolving. In the context of the cloud-based system 100, if a new URL is uncategorized, the present disclosure can be used to provide a categorization quickly. Thus, the cloud-based system 100 is not constrained to only categorizing URLs that are already classified. The approach generally includes training a machine learning model offline, such as with training data labeled according to the URL category. A new URL is loaded, the Web page is parsed, words and other characteristics of the Web page are extracted, and the words and other characteristics are analyzed with the machine learning model offline to output a predicted category. This machine learning process in production must be quick to avoid latency between a user request and an answer (block/allow) by the cloud-based system 100.

FIG. 8 is a flowchart of a model training process 420. The model training process 420 includes data labeling for model training (step 422), data preprocessing for feature building (step 424), feature extraction and building (step 426), and serializing a machine learning model (step 428). The model training process 420 contemplates implementation as a method, via a server 200, and as a non-transitory computer-readable storage medium having computer-readable code stored thereon for programming one or more processors to perform steps.

Of note, the model training process 420 leverages the cloud-based system 100 and the fact the cloud-based system is multi-tenant, has a large number of users 102, and can process tens or hundreds of billions of transactions or more a day. That is, the cloud-based system 100 has a large data set of URL transactions. The cloud-based system 100 can utilize a database of known URL classifications. This can be managed by the central authority 152 and promulgated to each of the enforcement nodes 150. The present disclosure is focused on classifying new URLs and their content such that the new URLs can be added to the database of known URL classifications. Again, the reach and extent of the cloud-based system 100 enable the detection of unknown URLs as they pop up. The large data set can be stored in the storage cluster 156 and used herein for model training.

Each of the steps in the model training process 420 is now described in detail.

Data Labeling for Model Training

The data labeling for model training step 422 includes obtaining data from the cloud-based system 100 for training a machine learning model via supervised learning. That is, the cloud-based system 100 has a large amount of data based on ongoing monitoring, and this data can be leveraged to train a model. The data labeling for model training step 422 includes running a big data query on the URL transactions in the storage cluster 156 and filtering out websites relevant to specific categories. Here, it is possible to obtain a large amount of data that can be labeled with specific URL categories.

The data labeling for model training step 422 can also include validation of the data. This can include running scripts on the data to validate the existence of domains and running scripts that may use third party services to validate the websites.

The data labeling for model training step 422 can also include arranging the data such as arranging the websites in order of their content size, such as in descending order.

Finally, the data labeling for model training step 422 can include using scripts as well as human-based verification to validate the URLs in the data match the category they are assigned to. The objective here is to make sure the data for training is properly labeled.

An output of the data labeling for model training step 422 is a set of URLs, with each being assigned to a category of a plurality of categories.

Data Preprocessing for Feature Building

A feature is an individual measurable property or characteristic of a website. For an effective machine learning model, it is important to choose informative, discriminating, and independent features. For URL classification, each feature can be anything that is measurable and representable numerically. The data preprocessing for feature building step 424 relates to manipulating the data from raw Hypertext Markup Language (HTML) files for each URL from the data. The manipulating involves processing the raw HTML files for feature extraction and building.

The data preprocessing for feature building step 424 includes obtaining a raw HTML file for each URL in the set of URLs. This can be accomplished by loading each URL and storing the raw HTML file. Each of the raw HTML files is assigned the same category as the URL category from the data labeling for model training step 422.

For each of the raw HTML files, the data preprocessing for feature building step 424 performs data preprocessing. This means the raw data is manipulated to better allow the raw data to be used for features. That is, preprocessing means processing data in the raw HTML files and the pre means before the features are extracted/built. An output of the data preprocessing for feature building step 424 is data for each URL with an associated category, where the data is ready for feature extraction.

The preprocessing can include extracting specific/relevant HTML tags from the raw HTML files. The preprocessing can include converting all extracted data to text (e.g., images, etc., can be recognized), converting all words to lowercase (or uppercase, as long as it is uniform), and the like. The preprocessing can also include removing various data that is not relevant to features including, for example, special characters (e.g., < >, :, " ", etc.), numbers, cities/countries/places/etc., names, header and footer data, and the like. Also, the preprocessing can include combing all hyphens (i.e., -) to single words (e.g., abc-def→abcdef). Further, the preprocessing can include removing frequent words that do not contain much information, such as "a," "of," "the," etc. Finally, the preprocessing can include reducing words to their stem (e.g., "play" from "playing") using various stemming techniques.

Again, after the data preprocessing for feature building step 424, the raw HTML files are now a series of words with an associated category.

Feature Extraction/Building

The feature extraction and building step 426 utilizes the output from the data preprocessing for feature building step 424, namely the series of words with an associated category. The feature extraction and building step 426 is building features for each category and uses the series of words for each URL for each category.

The feature extraction and building step 426 includes calculating Term Frequency (T.F.) and Inverse document frequency (IDF) for each URL and its associated data. TF-IDF is a numerical statistic that is intended to reflect how important a word is to a document in a collection. The TF-IDF value increases proportionally to the number of times a word appears in a document and is offset by the number of documents in a collection that contain the word, which helps to adjust for the fact that some words appear more frequently in general.

Next, the words from the TF-IDF are ranked in order of importance. With the words ranked for each category, the feature extraction and building step 426 includes gathering important features for each category. This can include a reverse feature elimination technique to gather important features, using a selectKbest technique to gather important features, building a support vector machine model and using model weights to gather important features, etc.

The feature extraction and building step 426 can include a combination of the reverse feature elimination technique, selectKbest technique, and the support vector machine model to create a union corpus of words arranged in terms of importance.

Also, the feature extraction and building step 426 can use human-based selection to select words that describe the semantics and context of the category.

An output of the feature extraction and building step 426 is a set of features for each category of URL classification.

Serializing LightGBM Model

Finally, with all of the relevant features for each category of URL classification, the model training process 420 includes the serializing machine learning model step 428. In an embodiment, the present disclosure utilizes the Light Gradient Boosted Machine (LightGBM) model. LightGBM is an open-source distributed gradient boosting framework for machine learning originally developed by Microsoft. It is based on decision tree algorithms and used for ranking, classification and other machine learning tasks. Here, the model training process 420 includes marshaling the Light-GBM model into a flat buffer decision tree structure based on the extracted features.

URL Content Classification Process

FIG. 9 is a flowchart of a URL content classification process 450. The URL content classification process 450 contemplates implementation as a method, via a server 200, and as a non-transitory computer-readable storage medium having computer-readable code stored thereon for programming one or more processors to perform steps. In an embodiment, the URL content classification process 450 contemplates operation via an enforcement node 150 in the cloud-based system 100. Specifically, the URL content classification process 450 utilizes a trained machine learning model, such as one from the model training process 420.

The cloud-based system 100, via the enforcement node 150, can be configured for inline monitoring of the users 102. One aspect of this inline monitoring can be to allow/block URL content based on policy, i.e., specific categories. The cloud-based system 100 can include a database of known URL categories for URLs. The URL content classi-fication process 450 can be implemented to classify the content of an unknown URL.

The URL content classification process 450 includes loading a decision tree structure to represent the model in an enforcement node 150 and loading a list of features (step 452). Here, an in-memory decision tree structure is formed in the enforcement nodes 150 to represent the machine learning model.

For a new URL, i.e., uncategorized URL, the URL content classification process 450 includes data preprocessing for feature building (step 454). This step is similar to the data preprocessing for feature building step 424 to process a raw HTML file associated with the new URL.

The URL content classification process 450 includes counting the occurrence of words in the new URL belonging to the list of features in the decision tree structure (step 456).

The URL content classification process 450 includes parsing the decision tree structure based on the occurrence of words to generate a score (step 458).

The URL content classification process 450 includes determining a category for the new URL based on the score (step 460).

Finally, the URL content classification process 450 can store the determined category in the database for future categorization.

Command and Control

A command and control server (C2 server) is a computer that issues directives to devices that have been infected with rootkits or other types of malware, such as ransomware. C 2 servers can be used to create powerful networks of infected devices capable of carrying out distributed denial-of-service (DDoS) attacks, stealing data, deleting data or encrypting data in order to carry out an extortion scheme. C2 servers generally have a short shelf life; they often reside in legiti-mate cloud services and use automated DGAs to make it more difficult for detection. The latency in detection enables new C2 sits to proliferate.

ML is a promising technique to compensate for the latency in existing threat detection approaches for more timely detection and higher coverage. First, ML is able to learn from a large amount of data and build robust classifiers to identify normal patterns versus abnormal patterns, while C2 activities usually show different transaction patterns from those of normal web browsing activities. Second, making ML predictions can be very fast as long as feature extraction and collection are efficient, which is easily achievable by a modern Extract, Transform, Load (ETL) architecture with continuous monitoring and real-time data processing capability.

The ultimate outcome is an automated ML pipeline to detect C2 URLs and block further access to those URLs in near real-time.

To begin with, there are two possible ways to consume ML C2 predictions. First, deploying a trained ML model on the enforcement node 150 and block transactions when ML predicts those transactions as C2 activities. That is, running the ML model in real-time whenever a new, unknown domain is seen. Second, apply the ML on logs and regularly populate a database (blocklist or blacklist) with ML pre-dicted C2 URLs and block any further access to those sites. Obviously, the first approach results in lower latency than the second approach. However, the first approach consumes more resources on the enforcement node 150 and also risks the latency of the majority of benign transactions. It also limits the number of usable features of ML models and thus has a higher risk of False Positive (F.P.) and False Negative (F.N.) problems.

The second approach is more practical for a starting point. It provides a more flexible tradeoff between latency and model performance. For example, it is possible to investigate the model performance and resource consumption under different levels of latency requirements such as minute, hour, day, and week. The blocklist database (e.g., at each enforcement node 150) can be automatically updated in hourly or daily frequency depending on the use cases.

Data and Label Collection for C2 Modeling

There are techniques for content classification of URLs, such as described above with reference to dynamic content classification/categorization. An assigned category of malware/botnet categories are the main source of C2 URLs. These are also determined based on the monitoring in the cloud-based system 100. These hostnames are labeled as malicious, excluding hostnames from whitelisted domains. For example, whitelisted domains can include, without limitation, 'github.com', 'dropbox.com', 'google.com', 'amazonaws.com', 'google.co.uk', 'msn.com', 'iplogger.co', 'bitbucket.org', 'live.com', 'githubusercontent.com', 'twitter.com', 't.me', 'googleapis.com', 'facebook.com', 'microsoft.com', and the like.

In an example approach, there are over a million C2 hostnames in a C2 list. Hostnames not in the C2 list are labeled as benign, excluding those that appear in malware behavior data.

Allowed transactions from the miscellaneous or unknown URL category of the dynamic content classification/categorization are the source of data for training and testing the C2 ML model to learn C2 versus normal web browsing activities. Specifically, the transactions can be aggregated by companyid, userid, hostname, request, response, useragent, on an hourly basis.

The time period of the above data collection over a two-month period, resulting in billions of data points, 200 GB data, hundred of millions of hostnames, and tens of millions of valid hostnames.

C2 Features

There are five example types of features to classify normal versus C2 activities, i.e., lexical features of hostname strings, transaction patterns (one feature vector for each hostname/hour pair), webpage content inspection, domain reputation (such as from the domain reputation process 400), and malware relation.

Modeling

Figure 10:
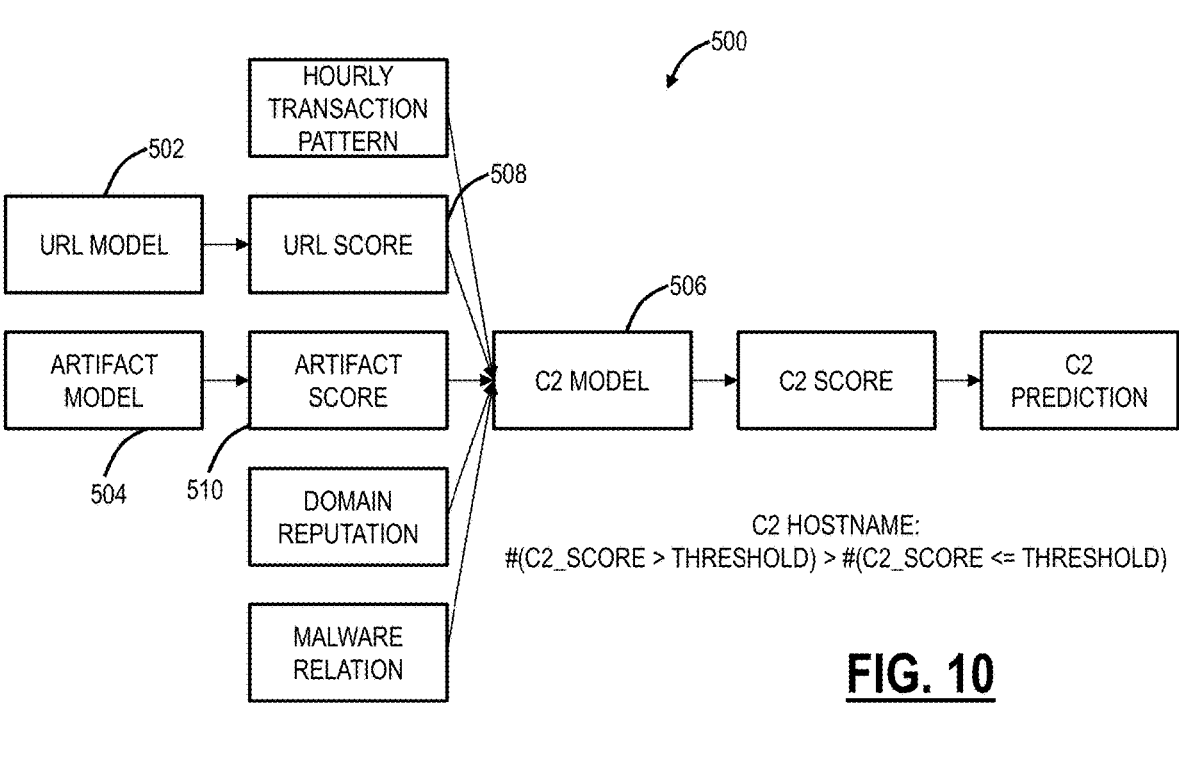
FIG. 10 is a flow diagram of a C2 detection process that is configured to provide a score of the likelihood a given domain is a C2 site or not.

FIG. 10 is a flow diagram a C2 detection process 500 that is configured to provide a score of the likelihood a given domain is a C2 site or not. The C2 detection flow can be an ensemble of multiple ML models, such as three LightGBM models, i.e., a URL model 502 using lexical features of the hostname, an artifact model 504 using web page content features, and a C2 model 506 using other features and the prediction results from the previous two models 502, 504, i.e., a URL score 508 and artifact score 510, respectively. The ensemble of three models 502, 504, 506 allows the advantage of more training data. For example, one could include benign hostnames from other sources (e.g., hostname from non-miscellaneous URL category) to learn a more robust benign/malicious classifier of hostnames.

Finally, the C2 prediction is an ensemble of multiple C2 model predictions in a given period of time. The intuition is that more observation results in a higher confidence.

Model Performance

Under a maximum 7-day latency constraint (a C2 prediction ensembles up to 7*24 C2 scores), this approach achieved close to 100% detection rate and 0.02% F.P. rate (~80% precision) on a testing dataset.

C2 Detection Process

Figure 11:
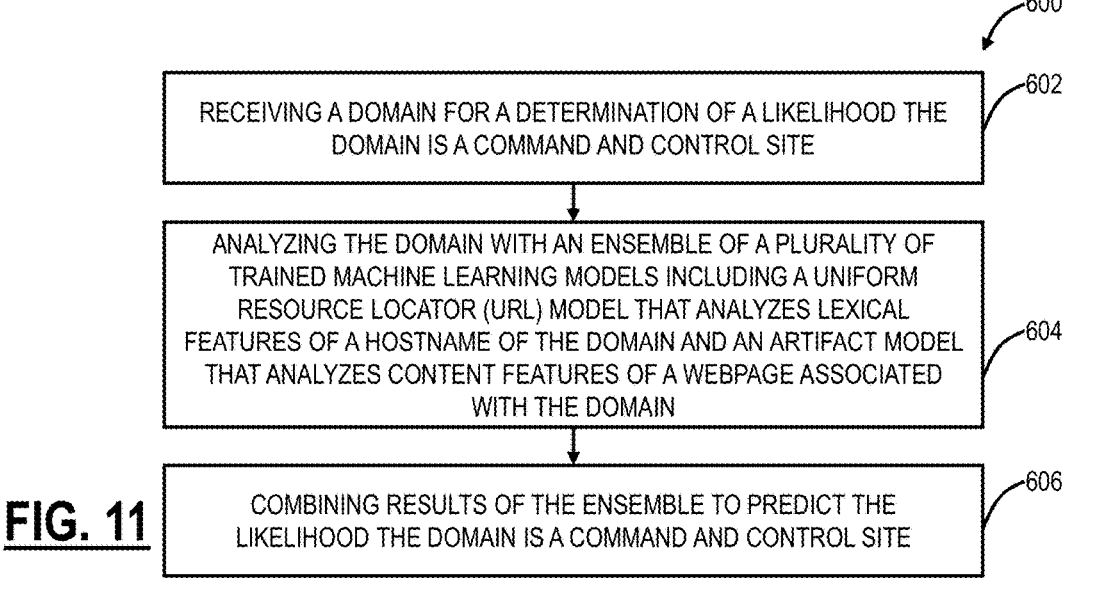
FIG. 11 is a flowchart of a C2 detection process.

FIG. 11 is a flowchart of a C2 detection process 600. The C2 detection process 600 contemplates implementation as a method, via a server 200, and as a non-transitory computer-readable storage medium having computer-readable code stored thereon for programming one or more processors to perform steps.

The C2 detection process 600 includes receiving a domain for a determination of a likelihood the domain is a command and control site (step 602); analyzing the domain with an ensemble of a plurality of trained machine learning models including a Uniform Resource Locator (URL) model that analyzes lexical features of a hostname of the domain and an artifact model that analyzes content features of a webpage associated with the domain (step 604); and combining results of the ensemble to predict the likelihood the domain is a command and control site (step 606).

The C2 detection process 600 can further include performing an action responsive to the likelihood the domain is a command and control site, wherein the action is one or more of adding the domain to a blocked list and causing a block of the domain. The C2 detection process 600 can further include performing the receiving responsive to a determination by a domain reputation process of a likelihood the domain is malicious.

The C2 detection process 600 can further include prior to the analyzing, training the URL model and the artifact model. The training can include using labeled log data from a cloud-based system that performs monitoring of a plurality of users. The labeled log data can be based on a content classification process. The ensemble can further include transaction patterns to the domain and/or an analysis of a reputation of the domain.

Phishing Detection

Phishing is the fraudulent process of attempting to acquire sensitive information, such as usernames, passwords, payment detail, personal identification information, etc., by masquerading as a trustworthy entity. For example, communications purporting to be from popular social web sites, auction sites, online payment processors, banks or other financial institutions, etc. are commonly used to lure unsuspecting users. Phishing often directs users to enter details at a fake website whose look and feel are almost identical to a legitimate one, such website having a URL associated with it. Phishing is an example of social engineering used to fool users and exploit the poor usability of current web security technologies. For example, emails, supposedly from the Internal Revenue Service, have been used to glean sensitive data from U.S. taxpayers. Most methods of phishing use some form of technical deception designed to make a link appear to belong to the spoofed organization. Misspelled URLs or the use of subdomains are common tricks used by phishers. In the following example URL, www.yourbank.example.com/, it appears as though the URL will take you to the example section of the yourbank website; actually this URL points to the "yourbank" (i.e., phishing) section of the example website. That is, phishing focuses on using popular brands to confuse users. Another common trick is to make the displayed text for a link (the text between the <A> tags) suggest a reliable destination, when the link actually goes to a phishers' site.

Unfortunately, phishing is very common and very effective using social engineering. There have been various recent email hacking horror stories in the corporate and political areas. These basically occur where emails, text messages, etc. are sent to unsuspecting users who inadvertently provide their credentials into phishing sites. As such, the malicious actors obtain the credentials and use it for their malicious goals. Organizations and individuals have been held hostage by these malicious actors. As long as users continue to input credentials for accessing resources, malicious actors will seek to exploit this security weakness.

The present disclosure relates to systems and methods of phishing detection of uncategorized Uniform Resource Locators (URLs) using heuristics and scanning. The phishing detection can detect if a URL is a likely phishing site or legitimate. An input to the phishing detection includes a URL, such as a new, uncategorized URL. The phishing detection scans the URL itself to determine whether it is phishing. The scan includes use of a Machine Learning (ML) model trained to detect suspicious URLs. For example, the phishing detection can use Term Frequency-Inverse Document Frequency (TDIDF) to generate features of a URL, and a Logical Regression model to train the model and predict using the trained model with the features generated by TDIDF. After a URL is flagged as suspicious, the phishing detection loads the URL, such as in isolation, and looks to identify a brand associated with the URL. Specifically, the present disclosure relates to detecting phishing URLs that attempt to impersonate legitimate brands. The load can be used to determine whether the suspect URL is phishing or legitimate based on analysis of code, metadata, etc. With the scan and load, the phishing detection can quickly, correctly, and efficiently categorize a suspect URL. Once categorized, the phishing detection can cause the URL to be allowed or blocked.

Figure 12:
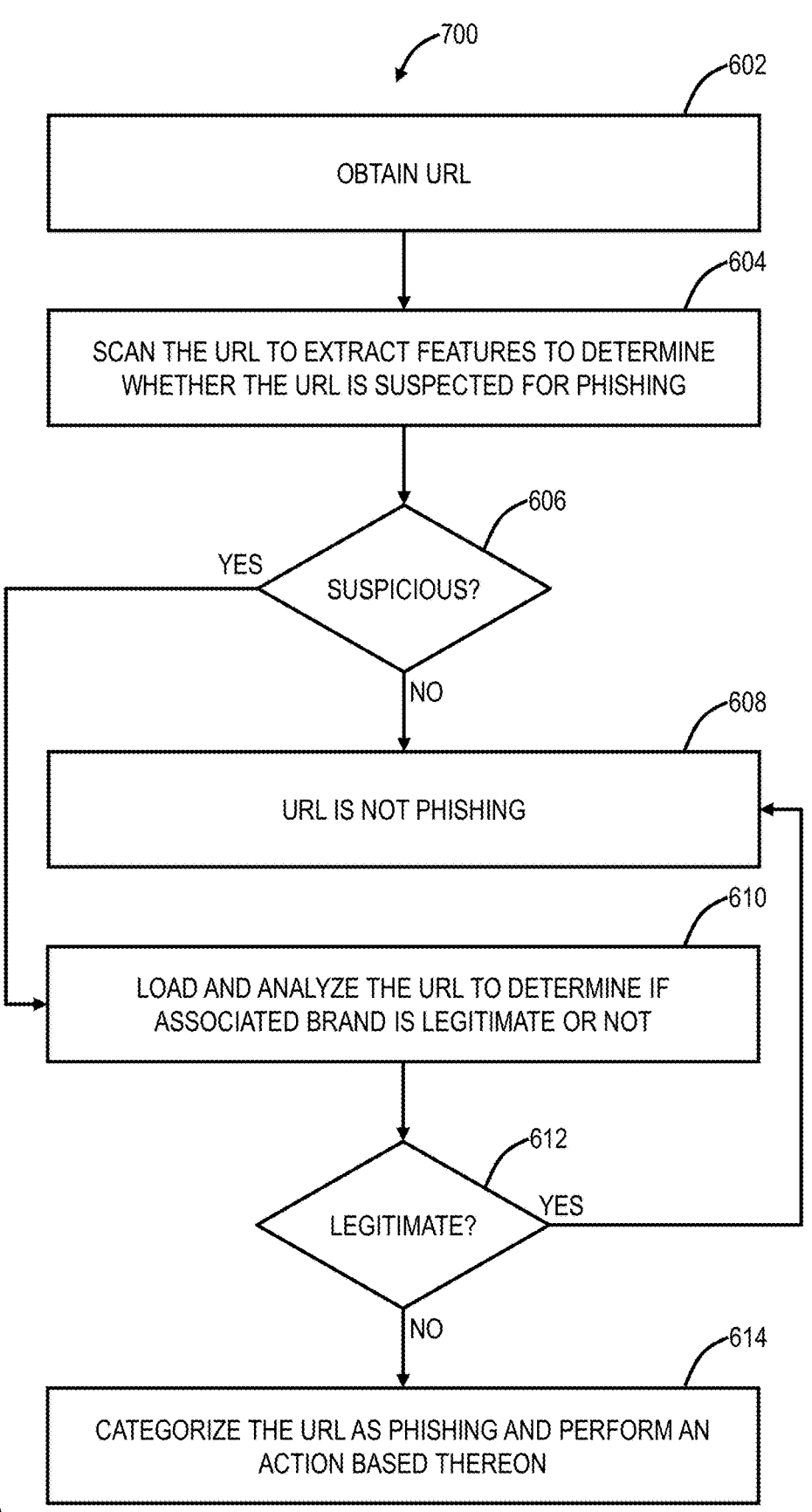
FIG. 12 is a flowchart of a phishing detection process.

FIG. 12 is a flowchart of a phishing detection process 600. The phishing detection process 600 contemplates implementation as a computer-implemented method, as instructions embodied in a non-transitory computer readable medium, and via a processing device such as the server 200. The phishing detection process 600 can be used to categorize a URL as phishing or legitimate. Such categorization can be used to manage a list of phishing sites for use in the network configurations 300A, 300B, 300C as well as other network configurations. The objective of the phishing detection process 600 is to determine whether or not a user 102 can access a URL.

The phishing detection process 600 includes obtaining a URL (step 602). This can be based on monitoring of the user 102. This can also be offline where a list of new URLs are provided to a server 200 or the like for categorization. That is, the phishing detection process 600 contemplates any technique where the URL is provided. In an embodiment, there can be a list of known phishing sites and the obtained URL can be one that is not in the list, i.e., new and uncategorized.

The phishing detection process 600 includes scanning the URL to extract features to determine whether the URL is suspected for phishing (step 604). The phishing detection process 600 utilizes a Machine Learning (ML) model to find suspicious URLs. In an embodiment, TFIDF is used to generate features of a URL. TFIDF is combination of two statistical techniques, T.F.—Term Frequency and IDF—Inverse Document Frequency.

The features are extracted solely from the URL itself. For example, the features can include keywords in the URL, redirection in the URL, a suspicious Top-Level Domain (TLD), a non-standard port, fake Hypertext Transfer Protocol Secure (HTTPS), a Message Digest 5 (MD5) in the URL, a shortener in the URL, an @ symbol in the URL, an Internet Protocol (I.P.) address in the URL, too many subdomains in the URL, etc.

The keywords in the URL that have been determined to be suspicious for phishing include:

| login | transaction | secure | safe |
|---|---|---|---|
| log-in | recover | ebayispai | session |
| sign-in | unlock | https | support |
| signin | confirm | auth | suport |
| account | live | authorize | unlock |
| verification | office | myaccount | update |
| verify | service | activation | verify |
| webscr | manage | #apps | verification |
| password | invoice | confirm | everivcation |
| credentuail | secure | drive | verifications |
| support | customer | mails | wallet |
| activity | client | mail | weblogin |
| security | bill | managment | management |
| update | online | password | .wellknown |
| authentication | safe | permission | .well-known |
| authenticate | form | perm is ion | spotify |
| authorize | confirm | recovery | |
| alert | account | recover | |
| purchase | banking | register | |

Redirection in the URL is a technique where the URL redirects to another page when the URL is opened. There are legitimate reasons for redirection such as for URL shortening, to prevent broken links, to allow multiple domain names to refer to a single web site, privacy, etc. Top-level domains (TLDs), such as .com, .org, and .edu, are the most prominent domains on the Internet 104. A suspicious TLD is a TLD far less familiar to everyday internet users, and frequently weaponized for malicious objectives. Suspicious TLDs—domains ending with things like .xyz, .gq, .country, .stream, —are popular with cybercriminals because they are usually cheaper to obtain than more universally recognized TLDs.

Non-standard ports can include various ports that are used by HTTP/HTTP besides ports 80 and 443. Some example non-standard ports can include 9090, 8080, 22, 23, 25, 53, 161, 445, 3389, 5500, 5900 . . . 5999, 9001, etc. Fake HTTPS means the URL displays a secure icon, but it is fake. Phishers utilize fake HTTPS to give a sense of security to unsuspecting users 102. An MD5 includes a hash in the URL. A shortener in the URL can be something like x.xyz, etc. and utilizes redirection.

These are ten examples of features that can be extracted from the obtained URL. The phishing detection process 600 can also use a ML model that is trained and then used to identify suspicious URLs. In an embodiment, a Logistic Regression model is used to train/predict the model using features generated by TFIDF. Of note, the Logistic Regression model was determined to have the best detection efficacy. The ML model is trained utilizing a set of training data where a set of URLs are provided—a first subset including legitimate URLs and a second subset including phishing URLs. The training can be updated over time with a new set of training data as the phishing environment is constantly evolving to evade detection.

Once trained, the ML model can be used in production (i.e., in a working environment) to categorize URLs as suspected of phishing or not (step 606). Specifically, the obtained URL has its features extracted (step 602) and is analyzed with the ML model (step 604). An output of the ML model includes whether the obtained URL is suspicious for phishing or not (step 606). If the URL is not suspicious (step 606), the phishing detection process 600 categorizes the URL as legitimate (not phishing) (step 608). This categorization can be used to allow the user 102 to access the URL, to keep the URL off a list of phishing sites, to keep the URL on a list of legitimate sites, etc.

If the ML categorizes the obtained URL as suspicious (step 606), the phishing detection process 600 includes loading and analyzing the URL to determine if the associated brand is legitimate or not (step 610). Again, the phishing detection process 600 is for detecting phishing sites that masquerade as legitimate brands, e.g., bancofamerica.com instead of bankofamerica.com. After the URL is classified as suspicious by the ML model (step 606), the phishing detection process 600 next determines whether it is legitimate or not for the brand. That is, this could be a legitimate site owned by the brand owner, not a phishing site.

The loading and analyzing can inspect the title, copyright, metadata, and page text of the URL for the purposes of determining whether the site is legitimate with respect to the brand or a phishing site using someone else's brand (step 610). Of note, a phishing site typically focuses solely on the visible aspects to the user 102 and does not focus on the code, e.g., the title, copyright, metadata, and page text. Inspection of this data enables a determination of whether the obtained URL is legitimate or not. The page text can be obtained by taking a screenshot of the loaded page and performing Optical Character Recognition (OCR).

Legitimate sites will have the title, copyright, and metadata match the page text that is obtained from the OCR. If the obtained URL is legitimate (step 612), the phishing detection process 600 categorizes the URL as legitimate (not phishing) (step 608). If the obtained URL is phishing (step 612), the phishing detection process 600 categorizes the URL as phishing and includes performing an action based thereon (step 614). The actions can include blocking the URL, updating a list of phishing sites, presenting an alert to the user, and the like.

CONCLUSION

It will be appreciated that some embodiments described herein may include one or more generic or specialized processors ("one or more processors") such as microprocessors; Central Processing Units (CPUs); Digital Signal Processors (DSPs): customized processors such as Network Processors (NPs) or Network Processing Units (NPUs), Graphics Processing Units (GPUs), or the like; Field Programmable Gate Arrays (FPGAs); and the like along with unique stored program instructions (including both software and firmware) for control thereof to implement, in conjunction with certain non-processor circuits, some, most, or all of the functions of the methods and/or systems described herein. Alternatively, some or all functions may be implemented by a state machine that has no stored program instructions, or in one or more Application-Specific Integrated Circuits (ASICs), in which each function or some combinations of certain of the functions are implemented as custom logic or circuitry. Of course, a combination of the aforementioned approaches may be used. For some of the embodiments described herein, a corresponding device such as hardware, software, firmware, and a combination thereof can be referred to as "circuitry configured or adapted to," "logic configured or adapted to," etc. perform a set of operations, steps, methods, processes, algorithms, functions, techniques, etc. as described herein for the various embodiments.

Moreover, some embodiments may include a non-transitory computer-readable storage medium having computer-readable code stored thereon for programming a computer, server, appliance, device, processor, circuit, etc. each of which may include a processor to perform functions as described and claimed herein. Examples of such computer-readable storage mediums include, but are not limited to, a hard disk, an optical storage device, a magnetic storage device, a ROM (Read Only Memory), a PROM (Programmable Read-Only Memory), an EPROM (Erasable Programmable Read-Only Memory), an EEPROM (Electrically Erasable Programmable Read-Only Memory), Flash memory, and the like. When stored in the non-transitory computer-readable medium, software can include instructions executable by a processor or device (e.g., any type of programmable circuitry or logic) that, in response to such execution, cause a processor or the device to perform a set of operations, steps, methods, processes, algorithms, functions, techniques, etc. as described herein for the various embodiments.

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following claims. Moreover, it is noted that the various elements, operations, steps, methods, processes, algorithms, functions, techniques, etc. described herein can be used in any and all combinations with each other.

What is claimed is:

1. A method comprising the steps of:
receiving a domain for a determination of a likelihood the domain is a command and control site;
analyzing the domain with an ensemble of a plurality of trained machine learning models including a Uniform Resource Locator (URL) model that analyzes lexical features of a hostname of the domain and an artifact model that analyzes content features of a webpage associated with the domain;
combining, by a command-and-control (C2) model of the ensemble, a URL score generated by the URL model and an artifact score generated by the artifact model of the ensemble, the C2 model being a trained gradient-boosted decision tree model configured to receive the URL score and the artifact score as inputs and to output a final score to predict the likelihood the domain is a command and control site; and
performing, by an enforcement node, an action responsive to the likelihood the domain is the command and control site, wherein the action is one or more of adding the domain to blocked list and causing a block of the domain.

2. The method of claim 1, wherein the steps include performing the receiving responsive to a determination by a domain reputation process of a likelihood the domain is malicious.

3. The method of claim 1, wherein the steps include prior to the analyzing, training the URL model and the artifact model.

4. The method of claim 3, wherein the training includes using labeled log data from a cloud-based system that performs monitoring of a plurality of users.

5. The method of claim 4, wherein the labeled log data is based on a content classification process.

6. The method of claim 1, wherein the ensemble further includes transaction patterns to the domain.

7. The method of claim 1, wherein the ensemble further includes an analysis of a reputation of the domain.

8. The method of claim 1, wherein the ensemble further includes a malware relation of the domain.

9. A non-transitory computer-readable medium comprising instructions that, when executed, cause one or more processors to perform steps of:

receiving a domain for a determination of a likelihood the domain is a command and control site;

analyzing the domain with an ensemble of a plurality of trained machine learning models including a Uniform Resource Locator (URL) model that analyzes lexical features of a hostname of the domain and an artifact model that analyzes content features of a webpage associated with the domain;

combining, by a command-and-control (C2) model of the ensemble, a URL score generated by the URL model and an artifact score generated by the artifact model of the ensemble, the C2 model being a trained gradient-boosted decision tree model configured to receive the URL score and the artifact score as inputs and to output a final score to predict the likelihood the domain is a command and control site; and perform, by a node, an action responsive to the likelihood the domain is the command and control site, wherein the action is one or more adding the domain to a blocked list and causing a block of the domain.

10. The non-transitory computer-readable medium of claim 9, wherein the steps include performing the receiving responsive to a determination by a domain reputation process of a likelihood the domain is malicious.

11. The non-transitory computer-readable medium of claim 9, wherein the steps include prior to the analyzing, training the URL model and the artifact model.

12. The non-transitory computer-readable medium of claim 11, wherein the training includes using labeled log data from a cloud-based system that performs monitoring of a plurality of users.

13. The non-transitory computer-readable medium of claim 12, wherein the labeled log data is based on a content classification process.

14. The non-transitory computer-readable medium of claim 9, wherein the ensemble further includes transaction patterns to the domain.

15. The non-transitory computer-readable medium of claim 9, wherein the ensemble further includes an analysis of a reputation of the domain.

16. The non-transitory computer-readable medium of claim 9, wherein the ensemble further includes a malware relation of the domain.

17. A cloud-based system comprising a plurality of interconnected nodes, each node comprises:

one or more processors; and a memory storing instructions that, when executed by the one or more processors, cause the node to:

receive a domain for a determination of a likelihood the domain is a command and control site;

analyze the domain with an ensemble of a plurality of trained machine learning models including a Uniform Resource Locator (URL) model that analyzes lexical features of a hostname of the domain and an artifact model that analyzes content features of a webpage associated with the domain;

combine, by a command-and-control (C2) model of the ensemble, a URL score generated by the URL model and an artifact score generated by the artifact model of the ensemble, the C2 model being a trained gradient-boosted decision tree model configured to receive the URL score and the artifact score as inputs and to output a final score to predict the likelihood the domain is a command and control site; and perform an action responsive to the likelihood the domain is the command and control site, wherein the action is one or more of adding the domain to a blocked list and causing a block of the domain.

18. The method of claim 1, wherein the combining includes aggregating predictions of the plurality of trained machine learning models over a predetermined time period to increase a confidence level of the final score.

19. The method of claim 1, wherein performing the action includes automatically updating a blocklist database stored at the node at an hourly or daily frequency with domains predicted as command and control sites based on the final score.

20. The method of claim 1, wherein analyzing the domain with the ensemble of the plurality of trained machine learning models further includes aggregating transaction data by company identifier, user identifier, hostname, request, response, and user agent over a predefined time for generating input features for the plurality of trained machine learning models.

* * * * *